July 25, 1961  B. SILVER  2,993,944
EXPENDABLE THERMOCOUPLE
Filed April 12, 1960  2 Sheets-Sheet 1
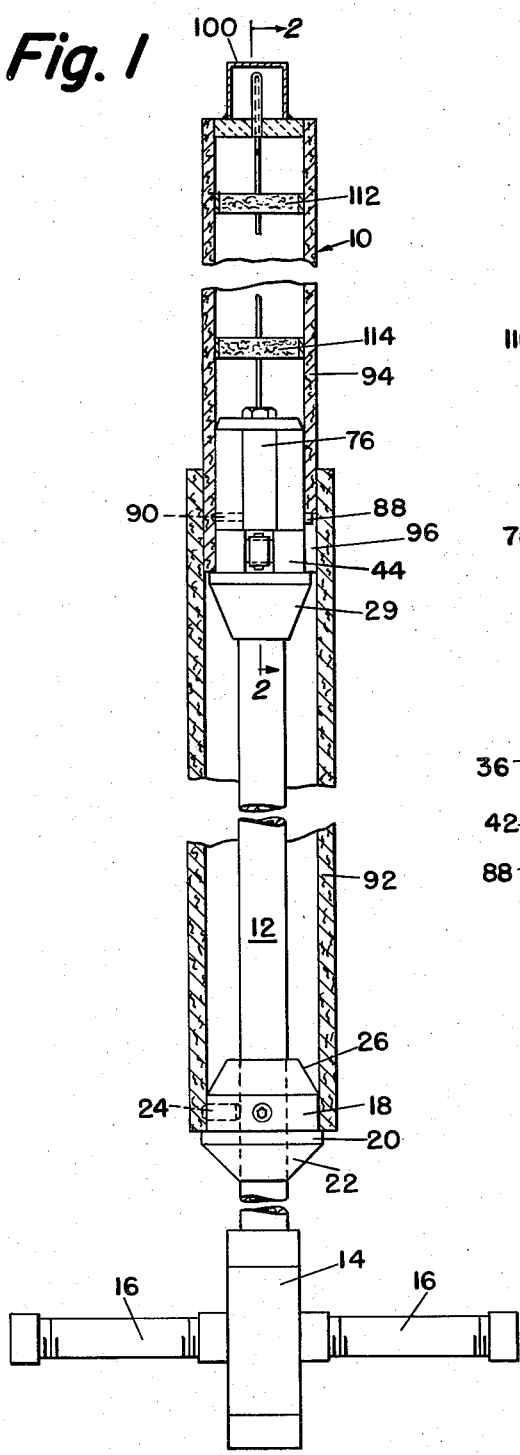
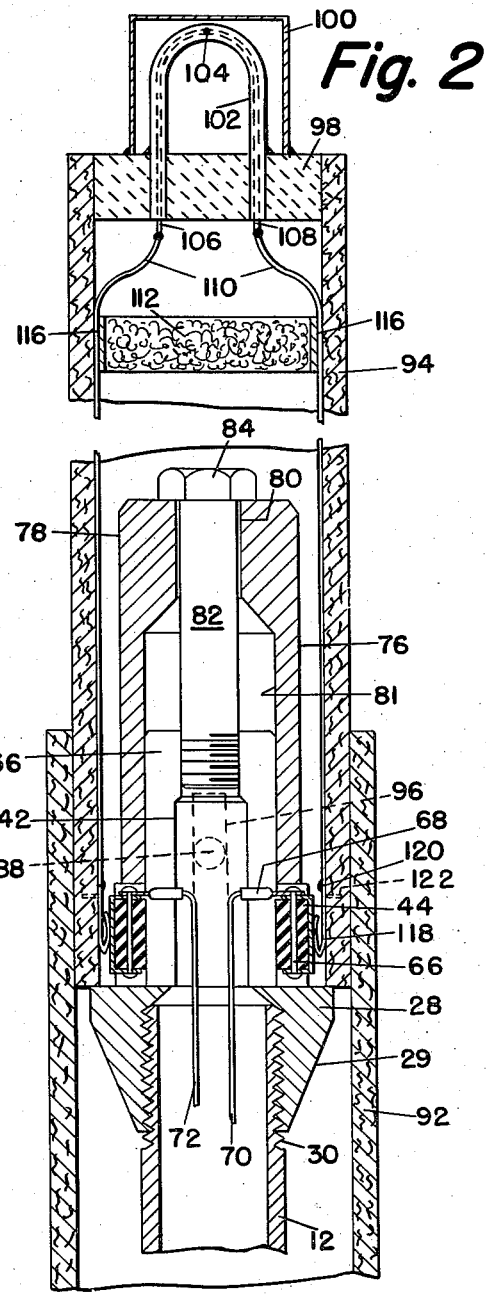
INVENTOR.
BERNARD SILVER
BY Arthur H. Seidel
ATTORNEY July 25, 1961     B. SILVER     2,993,944
EXPENDABLE THERMOCOUPLE
Filed April 12, 1960     2 Sheets-Sheet 2
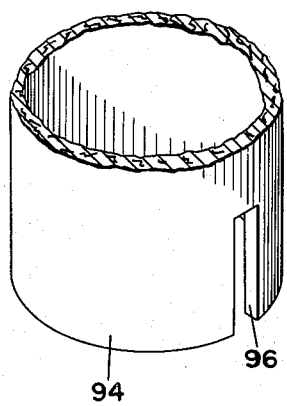
Fig. 4
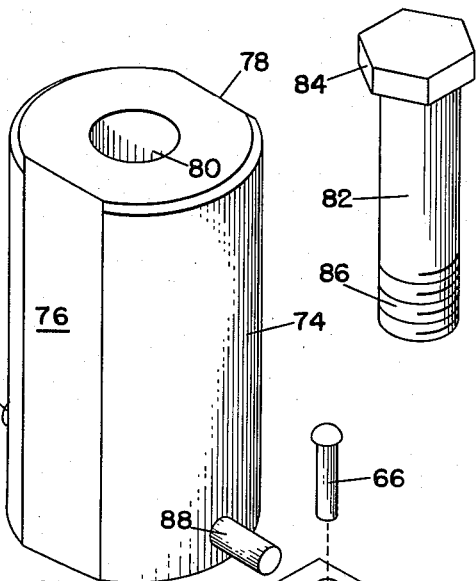
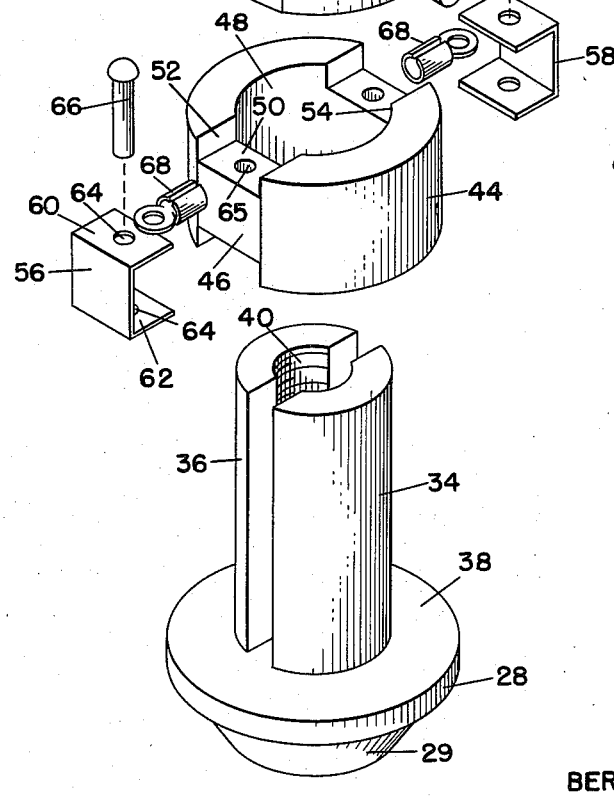
Fig. 3
INVENTOR.
BERNARD SILVER
BY Arthur H. Seidel
ATTORNEY

United States Patent Office 2,993,944
Patented July 25, 1961

2,993,944
EXPENDABLE THERMOCOUPLE

Bernard Silver, North Hills, Pa., assignor to Electro-Nite Engineering Company, Philadelphia, Pa., a corporation of Pennsylvania
Filed Apr. 12, 1960, Ser. No. 21,665
3 Claims. (Cl. 136—4)

The present invention relates to a thermocouple, and more particularly to an expendable, immersion-type thermocouple.

In the manufacture of steel, it is necessary to measure the temperature of the molten bath within the open hearth or electric furnace. The most accurate method for measuring the temperature of the molten bath is by means of a thermocouple which is connected to a recording device. Since the thermocouple must be immersed in the molten metal bath, the thermocouple must be mounted on an elongated holder by which the thermocouple can be inserted into the molten metal bath. In order to protect the wires extending through the holder from the thermocouple from being adversely affected by the heat of the molten metal bath, it is necessary to protect the holder from the heat of the bath. Also, since the thermocouple is immersed directly into the molten metal bath, the thermocouple has a relatively short period of life. Therefore, the thermocouple must be expendable, and must be easily removable from the holder to permit a new thermocouple to be mounted on the holder.

It is an object of the present invention to provide a novel expendable immersion-type thermocouple.

It is another object of the present invention to provide an immersion-type thermocouple in which the wires from the thermocouple are protected from excess heat.

It is a further object of the present invention to provide an expendable immersion-type thermocouple in which a thermocouple unit is easily and quickly replaceable.

It is still another object of this invention to provide an expendable immersion-type thermocouple in which an expendable thermocouple unit is secured to a holder in only one angular position.

Other objects will appear hereinafter.

For the purpose of illustrating the invention there is shown in the drawing a form which is presently preferred; it being understood, however, that this invention is not limited to the precise arrangements and instrumentalities shown.

FIGURE 1 is an elevational view, partly sectioned, of a thermocouple of the present invention.

FIGURE 2 is a sectional view taken along the lines 2—2 of FIGURE 1.

FIGURE 3 is an exploded view of the structure to which the expendable thermocouple unit is secured.

FIGURE 4 is a partial perspective view of an expendable tube of the present invention.

Referring to the drawing in detail, wherein like numerals indicate like elements, there is shown in FIGURE 1 a thermocouple of the present invention generally designated as 10.

The thermocouple 10 comprises an elongated iron pipe 12 having a junction box 14 for electrical wires secured to the back ends of pipe 12. Handles 16 are secured to the junction box 14 and are perpendicular to the pipe 12.

A collar 18 is disposed around the pipe 12 spaced from the junction box 14. The collar 18 is provided with a peripheral flange 20. The flange 20 is provided with a tapered surface 22. The collar 18 is provided with a plurality of holes on its peripheral surface. A setscrew 24 is mounted within each each of the holes for a purpose to be made clear hereinafter. The forward portion of the collar 18 is tapered as shown at 26.

As seen more clearly in FIGURE 2, the forward end of the pipe 12 is secured to a sleeve 28. The sleeve 28 is provided with a tapered surface 29 and a counterbore having threads 30. The threads 30 mate with threads on the end of pipe 12. As shown more clearly in FIGURE 3, the sleeve 28 is provided with a pair of semi-circular walls 34 and 36 extending in an axial direction thereby forming a shoulder 38 on the sleeve 28. The ends of the semi-circular walls 34 and 36 are threaded at 40. Below the thread 40, the semi-circular walls 34 and 36 are provided with a counterbore 42.

A terminal block 44 made from an insulating material is disposed on the shoulder 38 of the sleeve 28. The terminal block 44 is provided with a pair of flat surfaces 46 on its periphery, only one of the flat surfaces 46 being shown in FIGURE 3. The terminal block 44 is provided with an axial bore 48 of a diameter slightly larger than the diameter of the semi-circular walls 34 and 36. The terminal block 44 is disposed over the semi-circular walls 34 and 36 with the space between the semi-circular walls 34 and 36 being juxtaposed to the flat surfaces 46 on the terminal block 44. The terminal block 44 is provided with a pair of axially spaced channels having a bottom wall 50 and side walls 52 and 54. A pair of contact clips 56 and 58 are secured to the terminal block 44. The contact clips 56 and 58 are disposed between the walls 52 and 54 and have surfaces co-extensive with the flat surface 46 and the bottom wall 50 of the channels extending across the terminal block 44. The contact clips 56 and 58 are identical, therefore it is deemed sufficient to only describe contact clip 56 in detail. As shown more clearly in FIGURE 3, the contact clip 56 is U-shaped in cross-section and is provided with parallel arms 60 and 62. A pair of aligned holes 64 extend through the arms 60 and 62. A pin 66 extends through a hole in a wire lead 68, through hole 64 in arm 60, through hole 65 in the terminal block 44, and through the hole 64 in the arm 62. Thus, the pin 66 secures the contact clip 56 to the terminal block 44 in the channel defined by walls 50, 52 and 54. Wires 70 and 72 extend from the junction box 14 through the pipe 12 to the wire lead 68.

A cylindrical body 74 having opposed flat sides 76 and 78 is provided. The cylindrical body 74 is provided with a bore 80 and a counterbore 81. As shown more clearly in FIGURE 2, the cylindrical body 74 surrounds the upper end portion of the semi-circular walls 34 and 36. The semi-circular walls 34 and 36 extend into the counterbore 81 of the cylindrical body 74 and a bolt 82 operatively secures the semi-circular walls 34 and 36 to the cylindrical body 74. Bolt 82 is provided with a head 84 which is larger in cross-section than the bore 80. The bolt 82 is provided with threads 86 which mate with the threads 40 on the semi-circular walls 34 and 36. The counterbore 81 in the cylindrical body 74 is substantially the same size as the bore 48 in the terminal block 44. The terminal block 44 is disposed between the shoulder 38 on the sleeve 28 and the lowermost end of the cylindrical body 74. On that portion of the peripheral surface of cylindrical body 74 which is circular, pin member 88 and setscrew 90 are provided. The purpose for pin member 88 and the setscrew 90 will be made clear hereinafter.

A cylindrical tube 92 made from light weight expendable material such as fiberboard is coaxially disposed around the pipe 12. One end of the tube 92 is force-fitted onto the peripheral surface of the collar 18. The setscrew 24 on the collar 18 extends outwardly from the periphery of the collar 18 and cooperates with the inner peripheral surface of the tube 92 so as to assure that a force-fit is attained.

A tube 94 of light weight expendable material such as fiberboard is secured within the uppermost end of the tube 92 and rests on the shoulder 38. One end of the tube 94 is provided with a slot 96. The slot 96 cooperates with the pin member 88 so that when the tube 94 is assembled onto the sleeve 28, the slot 96 must be coextensive with the pin member 88. Thus, the tube 94 can only be assembled to the sleeve 28 in one angular position. The setscrew 90 on the cylindrical body 74 frictionally engages the inner peripheral surface of the tube 94 so as to frictionally retain the tube 94 in its operative disposition.

The tube 94 is provided with an expendable thermocouple unit at its end remote from the slot 96. The expendable thermocouple unit is secured to the end wall 98 of the tube 94. The expendable thermocouple unit includes a steel cup 100, a glass tube 102, and dissimilar metals 106 and 108. The dissimilar metals 106 and 108 are joined at joint 104 within the glass tube 102. Wires 110 are secured to the extremities of the dissimilar metals 106 and 108. The tube 94 is provided with a plurality of spaced spacers 112 and 114. The spacers 112 and 114 comprise an outer shell of cardboard and an inner disc of glass wool or rock wool so as to prevent heat from travelling within said tube 94, and acts as a barrier against the action of molten metal in case the thermocouple unit is retained in the molten metal bath so long that the molten metal invades the tube 94. Thus, the spacers 112 and 114 act as insulation. The spacers 112 and 114 are press-fitted into the tube 94 and are deformed at 116 so as to keep the wires 110 in spaced alignment. The wires 110 extend along the inner periphery of the tube 94 and through the deformation 116 on the outer periphery of the spacers 112 and 114.

A J-shaped flexible metal tab 118 is joined to the extremities of the wires 110 by joints 120. The tabs 118 are provided with spurs 122 which extend radially into the tube 94. The tabs 118 are positioned on opposite sides of the peripheral surface tube 94 and are spaced substantially 90 degrees from the slot 96. Thus, when the pin member 88 extends into the slot 96 on the tube 94, the tabs 118 will be juxtaposed to the contact clips 56 and 58. The tabs 118 are made from a flexible metal so that the arms of the tab are spring biased apart; thus assuring good contact at all times between the wires 110 and the contact clips 56 and 58.

The thermocouple 10 of the present invention is used as follows:

The tube 94, having an expendable thermocouple unit at one end, is secured to the sleeve 28 by inserting the tube 94 into the tube 92 with the slot 96 coextensive with the pin member 88. The tube 94 is force-fitted onto the sleeve 28 and the setscrew 90 will bite into the inner peripheral surface of the tube 94, thereby frictionally retaining the tube 94 in its operative disposition. The outer tube 92 is slid axially in respect to the inner tube 94 until it engages the shoulder 20. It is to be noted that tube 92 overlaps tube 94 in the region of terminal block 44 and affords maximum protection to this permanent part of the unit. Since the tube 94 has only one operative disposition, the tabs 118 will be in contact with the contact clips 56 and 58.

With the junction box 14 connected up to a recorder, the thermocouple 10 is inserted into a furnace by means of the handle 16. The tube 94 is immersed in the molten metal bath at any required depth up to the end portion of tube 92. When the tube 94 is in the molten metal bath, the reading is taken and then the expendable thermocouple unit is quickly destroyed by the heat of the molten metal bath. Then, the thermocouple 10 is removed from the molten metal bath and the remaining portion of the tube 94 is then removed from its position within the upper end of the tube 92. After the reading is taken, the tubes 92 and 94 are thrown away. When it is desired to take another temperature reading of the bath, tubes 92 and 94 are assembled as shown in FIGURE 1 and the probe is immersed in the molten bath as set forth above. Each time the thermocouple is immersed in a bath, the tubes 92 and 94 with the expendable thermocouple unit will have to be replaced. Since the tube 94 has a one-position connection with the sleeve 28, the tube 94 will always be properly positioned relative to the sleeve 28 so that the tabs 118 are in contact with the contact clips 56 and 58.

As used hereinafter, elements 28—90 may be referred to as a terminal means connected to the pipe 12 whereby a portion of tube 94 surrounds said terminal means and has a force-fit therewith. Since the tube 94 has a force-fit with the sleeve 28, the tube 94 with its expendable thermocouple unit is quickly and easily replaced. Since the tube 94 is made from a light weight material such as fiberboard, the tube 94 does not add appreciably to the weight of the thermocouple 10.

While the tubes 92 and 94 have been disclosed as being made from fiberboard, it will be appreciated that other light weight materials such as plastics may be used. While the sleeve 28, the terminal block 44, and the cylindrical body 74 have been disclosed as being made from separate elements, it is within the scope of this invention to make these elements in a single integral unit.

This application is a continuation in part of my copending application Serial No. 835,269 filed August 21, 1959, and entitled "Thermocouple."

The present invention may be embodied in other specific forms without departing from the spirit or essential attributes thereof and, accordingly, reference should be made to the appended claims, rather than to the foregoing specification as indicating the scope of the invention.

I claim:

1. An immersion thermocouple comprising a first expendable light-weight fiberboard tube, a second expendable light-weight fiberboard tube, the outer diameter of said second tube being substantially equal to the inner diameter of said first tube so that said first tube telescopes over said second tube and said second tube is extensible with respect to said first tube, an end wall extending across one end of said second tube, a protective cup mounted on said end wall with the lip of said cup juxtaposed to said end wall, a U-shaped ceramic tube in said cup with the arms of said ceramic tube extending through said end wall, dissimilar metals joined together in said ceramic tube, a separate wire connected to each of said dissimilar metals, said wires extending through said second tube toward the other end of said second tube, said wires being electrically connected to separate clips mounted in said second tube adjacent said other end of said second tube, a metal pipe within said first tube, wires in said pipe, means electrically connecting each clip to one of said wires in said pipe, and handle means on said pipe for holding said pipe as said one end of said second tube is immersed in a molten bath.

2. An immersion thermocouple in accordance with claim 1 including at least one insulating spacer within said second tube intermediate the ends thereof, said spacer including insulating material to prevent heat from travelling through said second tube from said one end toward said other end thereof.

3. An immersion thermocouple in accordance with claim 1 including a terminal means connected to said pipe, and a portion of said other end of said second tube surrounding said terminal means and having a force-fit therewith.

(References on following page)

References Cited in the file of this patent

UNITED STATES PATENTS

| | | |
|---|---|---|
| 2,463,427 | Richards | Mar. 1, 1949 |

FOREIGN PATENTS

| | | |
|---|---|---|
| 2,971,041 | France | Feb. 7, 1961 |
| 706,643 | Great Britain | Mar. 31, 1954 |

OTHER REFERENCES

Leeds and Northrup Pamphlet, entitled "A Simplification of Bath Pyrometry." This pamphlet is advertised in the September 1958 issue of "Iron and Steel Engineer" and the October 1958 issue of "Blast Furnace and Steel Plant."